United States Patent
Edwards

(10) Patent No.: US 7,198,314 B1
(45) Date of Patent: Apr. 3, 2007

(54) PASSENGER CABIN EXTENSION MEMBER

(76) Inventor: John A. Edwards, 5 Ashurst Road, Seaford, East Sussex (GB), BN25 1AH ( * ) Notice: Subject to any disclaimer, the term of this patent is extended or adjusted under 35 U.S.C. 154(b) by 541 days.

(21) Appl. No.: 10/171,530

(22) Filed: Jun. 11, 2002

(30) Foreign Application Priority Data

Jun. 23, 2001 (GB) ............................................ 0115445

(51) Int. Cl.
B60P 3/34 (2006.01)

(52) U.S. Cl. .................................................. 296/26.04
(58) Field of Classification Search ................ 296/171, 296/173, 165, 26.04, 26.05, 26.06
See application file for complete search history.

(56) References Cited

U.S. PATENT DOCUMENTS

| | | | | |
|---|---|---|---|---|
| 3,190,689 | A | * | 6/1965 | Calthorpe .................... 296/165 |
| 3,360,294 | A | | 12/1967 | Cieslak |
| 3,368,839 | A | | 2/1968 | Stewart |
| 3,608,954 | A | * | 9/1971 | Lynd ........................ 296/26.05 |
| 3,713,687 | A | * | 1/1973 | Hooks et al. ............. 296/26.06 |
| 3,733,102 | A | | 5/1973 | Serino |
| 3,744,841 | A | | 7/1973 | Schmidt |
| 3,809,426 | A | * | 5/1974 | Ratcliff ........................ 296/171 |
| 3,819,223 | A | * | 6/1974 | Cobb et al. .............. 296/26.05 |
| 3,823,974 | A | | 7/1974 | Patnode |
| 3,941,415 | A | * | 3/1976 | Cooper ........................ 296/173 |
| 4,077,662 | A | * | 3/1978 | Kauffman .................... 296/165 |
| 4,133,571 | A | | 1/1979 | Fillios |
| 4,222,604 | A | | 9/1980 | Human |
| 4,261,613 | A | | 4/1981 | Alford |
| 4,362,258 | A | | 12/1982 | French |
| 4,397,497 | A | | 8/1983 | Alonzo |
| 4,542,932 | A | * | 9/1985 | Whiteman ................ 296/26.04 |
| 4,603,901 | A | | 8/1986 | McIntosh |
| 4,981,319 | A | * | 1/1991 | Gerzeny et al. ............ 296/165 |
| 5,016,858 | A | * | 5/1991 | Mitchell ....................... 296/165 |
| 5,078,441 | A | * | 1/1992 | Borskey ....................... 296/165 |
| 5,595,418 | A | | 1/1997 | Medlin |
| 5,934,738 | A | | 8/1999 | Welles |
| 5,971,459 | A | | 10/1999 | Gauthier |
| 6,048,016 | A | | 4/2000 | Decker et al. |
| 6,325,447 | B1 | * | 12/2001 | Kuo ............................ 296/165 |
| 2003/0042661 | A1 | * | 3/2003 | Popjoy ..................... 267/64.28 |

FOREIGN PATENT DOCUMENTS

| | | |
|---|---|---|
| DE | 3104585 | 11/1982 |
| DE | 4040221 | 6/1992 |
| DE | 19630765 | 2/1998 |
| DE | 19835807 | 10/1999 |
| FR | 2662412 | 11/1991 |
| FR | 2802477 | 6/2001 |
| GB | 1067174 | 5/1967 |
| GB | 2059498 | 4/1981 |
| GB | 2244959 | 12/1991 |
| WO | WO 98/04425 | * 2/1998 |

OTHER PUBLICATIONS

Anonymous, "Romahome Brochure" by Island Plastics International Ltd., UK Jan. 8, 2000.
Anonymous, "Diagrams of Romahome Product" by Island Plastics International Ltd., UK Jan. 8, 2000.

* cited by examiner

Primary Examiner—Stephen T. Gordon
Assistant Examiner—Lori L Coletta
(74) Attorney, Agent, or Firm—Tipton L. Randell

(57) ABSTRACT

FIGS. 3a and 3b show two side elevation views of a vehicle passenger cabin defining a passenger space wherein are featured an actuation device, generally designated 2, balancing gas springs, generally designated 65, pivoting hinge member 4, inner weather seal 50, outer weather seal 51 and draught proof brush seal 62. In view generally designated 3a, a pivoting extension member 3 is shown in the retracted position for on-road driving. In view generally designated 3b, a pivoting extension member 3 is shown in the extended position for passenger access and use.

18 Claims, 14 Drawing Sheets

Section On A-A FIG. 3

PASSENGER CABIN EXTENSION MEMBER

CROSS-REFERENCE TO RELATED APPLICATIONS, IF ANY

This application claims the benefits under 35 U.S.C. §119(a)–(d) of co-pending United Kingdom patent application No. 0115445.9, filed Jun. 23, 2001. United Kingdom patent application No. 0115445.9 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

TECHNICAL FIELD OF THE INVENTION

The present invention relates to a passenger cabin extension member for land or marine based vehicles.

BACKGROUND OF INVENTION

The invention relates to a motor caravan or mobile office or mobile medical unit or mobile workshop, and includes all types of passenger vehicles, such as marine and land based vehicles, any of which may comprise a permanently or detachably fixed passenger cabin mounted onto a vehicle chassis, or in any of which the passenger cabin comprises an integral part of the vehicle design and manufacture. When such a vehicle is parked off the highway or waterway, there is an opportunity for increasing the internal volume of the passenger cabin bodywork by the use of an extension member. The rules and regulations with regard to the external dimensions that apply to vehicles on the public highway or waterway do not apply when the vehicle is parked-up or off that highway or waterway.

There are of many examples of prior art where the internal volume of passenger cabins is increased by extending a section of any or all of the walls, floor and roof. Such an expansion is generally comprised of one of four types. The first type is made from a natural or synthetic flexible fabric type of material, often attached in part to the vehicle bodywork and in part to a rigid enclosure lid, see patents DE3104585, GB2059498, DE19630765, U.S. Pat. Nos. 5,595,418, 4,603,901, 4,362,258, 3,823,974, and 3,744,841. The second type are made from folding panels, see patents FR2802477, U.S. Pat. Nos. 5,934,738, and 3,360,294. The third type are made from nesting panels, see patent U.S. Pat. No. 3,733,102. The fourth type are made as a rigid structure, and pivot or slide outwardly and inwardly horizontally to extend the internal volume of the passenger cabin to the front, side or rear, see patents U.S. Pat. Nos. 6,048,016, 4,222,604, 4,133,571, and 3,368839, GB2244959, U.S. Pat. No. 4,397,497, DE4040221, and U.S. Pat. No. 5,971,459.

The advantage of a rigid extension member over one wherein at least part is a collapsible fabric type structure or at least part is made from folding or nesting panels is twofold. Firstly, an insulated rigid structure with weather seals reduces heat leakage into and out of the extension member, whether the extension member is fully extended, fully retracted or whether the extension member is located anywhere between the fully extended and fully retracted positions. This reduces the fuel consumption to such as heating and cooling devices. Secondly, a rigid structure is generally more secure than one made from a collapsible fabric, folding panels or nesting panels, thereby offering added protection.

One part of the passenger cabin that particularly benefits from an elevating rigid extension member is the area above the driver's compartment, often referred to as the "luton". Traditionally, the leading front edge of an above driver's compartment has a low profile to reduce to a minimum any resistance to airflow when driving, because this saves on vehicle fuel consumption. However, it also invariably means that the internal dimensions of this compartment are quite small, especially at the leading front edge, thereby limiting its usefulness. So, by inserting a pivoting, sliding, or pivoting and sliding extension member with an inner and outer seal to prevent water, dust and air ingress, it is possible to elevate upwardly, in relation to the passenger cabin, a section of the roof and wall to increase the internal volume of this area, thereby making it more useful. Because the area above the driver's compartment is higher than the main floor of the passenger cabin, this area may be referred to as the "luton" or "penthouse."

Other designs of passenger cabins also incorporate a cover member or shield. This may be for the purpose of additional protection or additional insulation, or may simply be for the purpose of keeping the vehicle clean and protecting it from adverse or hostile weather conditions. See patents GB1067174, U.S. Pat. No. 4,261,613, DE19835807 and FR2662412.

One part of the passenger cabin that particularly benefits from a cover member or shield is the driver's compartment, as this usually is comprised of metal and glass, the thickness of which is often quite thin. Because of this, heat easily leaks through, both inwardly and outwardly. The direction and rate of heat leakage is in part subject to the difference between the ambient temperature and the temperature inside the passenger cabin. The greater the temperature difference, the faster heat will leak through the driver's compartment. There is also the added problem of vulnerability to attack, especially by thieves with car theft skills and tools.

The pivoting roof and the pivoting cover member or shield can be either linked together in use, with one moving the other, using a common actuation means, or they can operate independently of each other using a common or separate actuation means.

SUMMARY OF INVENTION

The present invention provides a vehicle passenger cabin defining a passenger space, said passenger cabin having an extension member movable between an extended position and a retracted position, said extension member in the extended position increasing the volume of said passenger space, wherein said extension member is a rigid body in moveable contact with the passenger cabin in the extended and retracted positions. An optional shield can be added. Said optional shield is movable between a stored position and a deployed position, said shield in said deployed position overlying one or more window apertures of said cabin.

In a further embodiment, the present invention provides a vehicle passenger cabin defining a passenger space, said passenger cabin including a rigid body extension member movable between an extended position that is elevated relative to said cabin, and a retracted position that is retracted relative to said cabin, said rigid body extension member in the extended position increasing the volume of said passenger space, with the rigid body in moveable contact with the passenger cabin in the extended and retracted positions. An actuation means operable to move said rigid extension member between said extended and retracted positions is present. Said actuation means includes motive means fixed relative to said cabin and force transmission means movable relative to said cabin. A counterbalance means is included for counterbalancing said extension member in the extended position. A shield, pivotable between a stored position and a deployed position, is present, with the shield in the deployed position overlying at least one window aperture of the cabin.

DETAILED DESCRIPTION OF THE INVENTION

Figure 1:
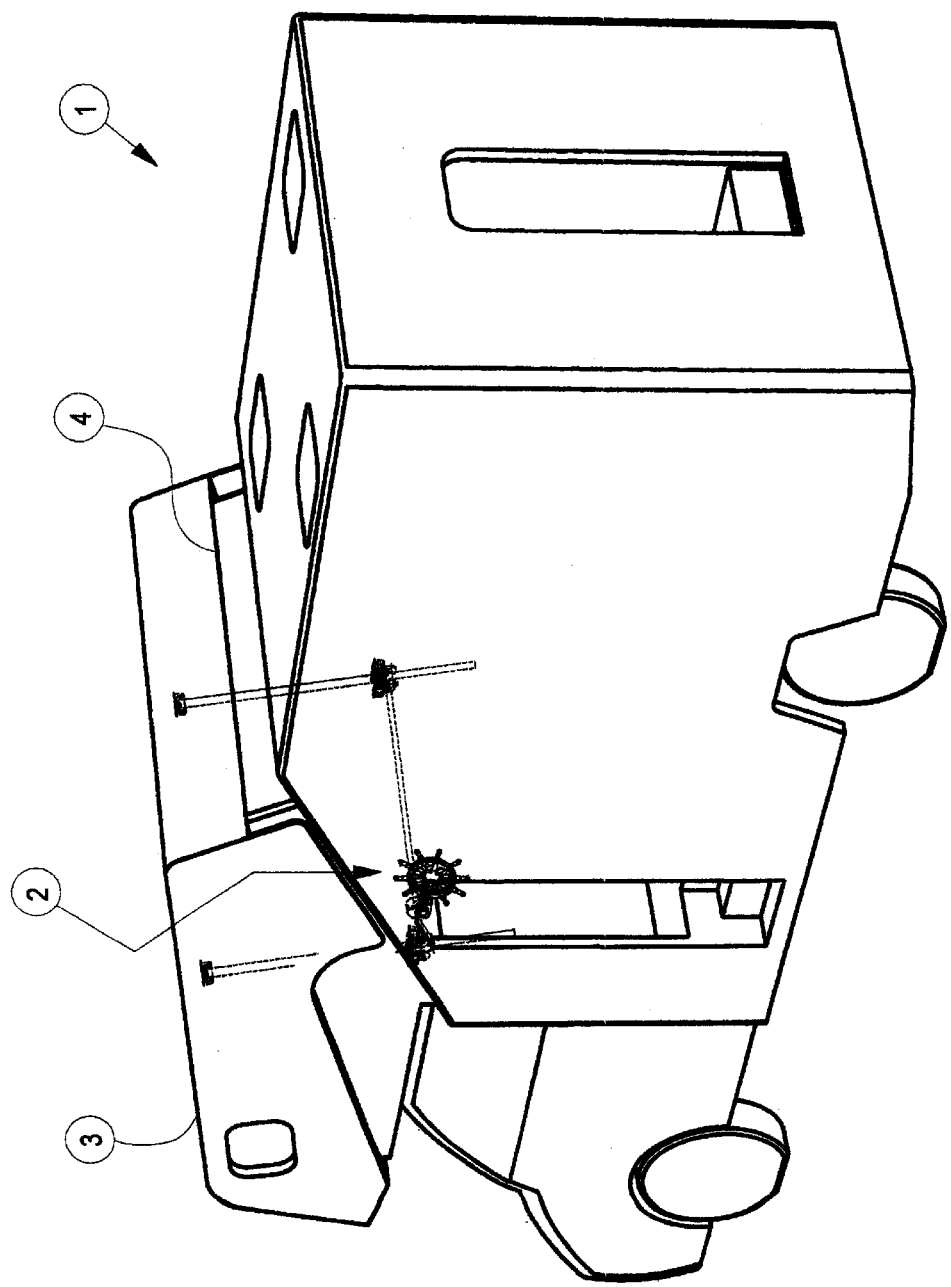
FIG. 1 shows a perspective view of the vehicle passenger cabin with the actuation means drawn as hidden detail dotted lines. The pivoting extension member is shown in the retracted position.

According to a first embodiment of the invention, there is provided a vehicle passenger cabin 1 defining a passenger space, said passenger cabin 1 having an extension member 3 movable between an extended position that is elevated relative to said cabin 1, and a retracted position that is retracted relative to said cabin 1, said extension member in the extended position increasing the volume of said passenger space, wherein said extension member 3 is a rigid body.

Preferably, the extension member 3 is constructed from rigid or semi-rigid panel-work that is moulded as a monocoque glass reinforced plastic structure or the extension member 3 is riveted or bonded together using panel sections and, for example, matching aluminium extrusions or the extension member 3 comprises a rigid framework to which is attached a covering material, or the extension member 3 is any generally rigid structure.

Either a sliding means or a pivoting means for moving the extension member 3 can be used. For the sliding configuration, the extension member 3 can be slidably attached to the passenger cabin 1 via standard linear bearings 68. For the pivoting configuration, along one edge there is a hinge or pivot means 4, which fixedly or removably connects the pivoting extension member 30 to an appropriate and matching part of the passenger cabin 1.

Preferably there is a sealing means between the extension member 3 and the passenger cabin 1 to prevent the ingress of hostile weather elements, such as wind and rain. Preferably an inner seal 50 and outer seal 51 are used to ensure that rain, wind and dust cannot enter the passenger area both in the driving mode and in the parked mode. A perimeter brush seal 62 can also be added so that a draught proof seal is maintained regardless of the location of the extension member 3 between the retracted and extended positions.

The passenger cabin 1 may have an extension portion defined by an upstanding wall 69. The extension member 3 is provided over and around said upstanding wall 69. In this configuration, a sealing means for preventing the ingress of hostile weather conditions is present between the extension member 3 and the upstanding wall 69.

The extension member 30 may have more than one pivot means. Detachable pivot means may be fitted to both the front and rear transverse (relative to the passenger cabin) bottom edges 41, 42 of the extension member 30, with corresponding detachable pivot means fitted to the front and rear (relative to the passenger cabin) panels of the upstanding wall. By detaching the pivot means at the front and pivoting the extension member 30 about the rear pivoting axis, the extension member 30 elevates upwardly and rearwardly toward an extended position. Alternatively, detaching the pivot means at the rear and pivoting the extension member about the front pivoting axis, the extension member 30 elevates upwardly and forwardly toward an extended position.

According to a second embodiment of the present invention, there is provided a vehicle passenger cabin 1 defining a passenger space, said passenger cabin having an extension member 3 movable between an extended position that is elevated relative to said cabin 1, and a retracted position that is retracted relative to said cabin 1, said extension member 3 in the extended position increasing the volume of said passenger space, wherein said extension member 3 is a rigid body and including all or any of actuation means 2 operable to move said extension member 3 between said extended and retracted positions, counterbalancing means 19, 20 operable to generally counterbalance said extension member 3 between said extended and retracted positions, and damper means operable to dampen the movement of said extension member 3 between said extended and retracted positions.

An actuation means 2 can be added to move the extension member 3 between an extended and retracted position. Also a counterbalancing means 19, 20 can be added to generally counterbalance the extension member 3 between an extended and retracted position.

Although not necessary, preferably, for reasons of maximum safety, both the actuation means 2 and the counterbalancing means 19, 20 can be used side by side together, although each of the actuation means 2 and the counterbalancing means 19, 20 can by itself adequately support the weight of the extension member 3. The counterbalancing means 19, 20 can comprise two gas springs. These gas springs counterbalance the weight of the extension member 3. The actuation means 2 can comprise two screw jacks 11, 12, the input shafts of which are connected by a common drive shaft. This ensures that, in use, the screw jacks 11, 12 will remain synchronised, one with the other, so they lift and lower together. The common connecting drive shaft is driven by the output shaft 8 of a bevel gearbox 7. The input shaft 25 and output shaft 8 of said bevel gearbox 7 are perpendicular to each other. Hence, when a hand wheel 6, which is mounted on the bevel gearbox input shaft 25, is turned, drive is transmitted by connection to the screw jacks 11, 12. Each element in the transmission can be connected using a matching friction coupling or a key and keyway connection. Screwjacks 11,12 are a preferred means of actuating the extension member 3. If a suitable lifting rate is selected, and if a suitable gearing ratio is selected, the screw jacks 11, 12 cannot be easily back-driven, That is, the weight of the extension member 3, or even additional weight applied by, for example, someone sitting or standing on top of the roof of the extension member 3, will not be able to force the screw jacks 11, 12 to back drive and move the extension member 3 downwardly toward retraction. Consequently, passengers can sit and work and relax beneath the raised extension member 3 with maximum safety.

Further, on the matter of safety and relating to quality control, as with the automobile industry, a "certificate-of-conformity" can be sought from both the screw jack and the gas spring suppliers, legally guaranteeing the performance and quality of these products. In addition to this, a letter can be sought from both the screw jack and the gas spring suppliers that would in effect approve the installation configuration of their products within the passenger cabin.

With a pivoting extension member 30, the top ends of the counterbalancing gas springs 19, 20 and the top end of the screw jack threaded screw members 15, 16 are connected to the pivoting extension member 30 via pivoting joints, 21, 22 and 17, 18, respectively. Also, the bottom ends of the counterbalancing gas springs 19, 20 and the main body members of the screw jacks are connected to the vehicle passenger cabin via pivoting joints 23, 24 or trunnion means 13, 14, respectively. Hence, as the pivoting extension member 30 extends and retracts and the angle between the extension member 30 and the vehicle passenger cabin 1 changes, and also as the angle between the actuation means 2 and extension member 30 and vehicle passenger cabin 1 changes, and also as the angle between the counterbalancing means 19, 20, extension member 30 and vehicle passenger cabin 1 changes, so all the connecting joints will pivot in use.

Alternatively, only the counterbalancing gas springs 19, 20 can be fitted, so that the extension member 30 is lifted and lowered by hand or some other means. This is currently the practice with many automobile manufacturers, who fit gas springs to the rear tailgate, or rear door of a hatchback or estate car. It is generally accepted that gas springs are fit for this purpose and produce an adequate level of support and safety for family members who may well sit underneath the elevated door when enjoying such things as a picnic. The power of the gas springs and the geometry in which they function can be designed so that a constant counterbalancing force is applied to the extension member 30. Alternatively, if the gas springs 19, 20 are biased so that the force they apply is greater than that required to overcome the weight of the extension member 30, then any means used for extending and retracting the extension member 30 would have to exert a pulling force on the extension member 30. Alternatively, if the gas springs 19, 20 were biased so that the force they apply is less than that required to overcome the weight of the extension member 30, then any means used for extending and retracting the extension member 30 would have to exert a pushing force on the extension member 30. Alternatively, if the gas springs 19, 20 were mounted so that the counterbalancing force applied to the extension member 30 changed from a force greater than that required to overcome the weight of the extension member 30 to a force that is less than that required to overcome the weight of the extension member 30, as the counterbalancing means 19, 20 moved between extended and retracted positions, then any actuation means 2 used for extending and retracting the extension member 30 would have to exert both a pulling and a pushing force.

It would also be possible to fit two sets of gas springs 19, 20. One set would generally counterbalance the weight of the extension member 30 (like the automobile tailgate), and the second set of gas springs 19,20 would function as an actuation means 2. The use of two sets of gas springs 19, 20 in this way would be more safe than using one set of gas springs only, although, as with an automobile rear tailgate door, one set of two gas springs 19, 20 would be sufficient for this purpose.

Either or both of the actuation means 2 and the counterbalancing means 19, 20 can be located inside the passenger cabin 1, or part can be located internally, that is, inside the passenger cabin 1 and part can be located externally, that is, outside of the passenger cabin 1, depending upon the application.

Alternatively, an actuation means 2 alone can be fitted, which will take all of the weight of the extension member 30, without the use of a counterbalancing means. In this arrangement, the reduction gearing within or without the actuation means 2 is sufficient as to allow actuation such as by a hand wheel 6 or electric motor 70 or other means.

Alternatively, a damper means can be fitted, either alone or in addition to either or both the actuation means and the counterbalancing means. The function of the damper means is for diminishing the amplitude of vibration or sudden movement or the sudden cessation of movement during the movement of the extension member 30 between the fully extended and the fully retracted positions.

According to a third embodiment of the present invention, there is provided a vehicle passenger cabin 1 defining a passenger space, said passenger cabin 1 having an extension member 30 movable between an extended position that is elevated relative to said cabin 1 and a retracted position that is retracted relative to said cabin 1, said extension member 30 in the extended position increasing the volume of said passenger space, wherein said extension member 30 is a rigid body and including a shield 28 movable between a stored position and a deployed position, said shield 28 in said deployed position overlying one or more window apertures of said cabin 1.

The actuation means 27 by which the extension member 30 and the shield 28 are moved may comprise a common means or a separate means. In a preferred embodiment, a hand wheel 6 is mounted onto the input shaft 32 of a worm reduction gearbox 33, using friction couplings or a key and keyway connection. When said hand wheel 6 is turned, driving force is transmitted from the hand wheel 6 through the worm reduction gearbox 33, via the hollow output shaft 32 of said worm reduction gearbox 33, to a connected transverse drive shaft 34, which is movably attached to the vehicle passenger cabin bodywork via two wall mounted flange bearings 37, 38. Each end of the transverse drive shaft 34 extends through the vehicle passenger cabin bodywork via leak proof seals and are fixedly attached to the pivoting cover member or shield 28, using a friction coupling or key and keyway attachments. Hence, when the hand wheel 6 is turned, the pivoting shield 28 will pivot in use between a stored and deployed position to cover and uncover the driver's cab window area.

For reasons of safety, a worm reduction gearbox 33 is a preferred means of transmitting driving force from the hand wheel 6 to the transverse drive shaft 34 to which it is connected via a friction coupling or a key and keyway connection. The gearing or reduction ratio between the input shaft 32 and the output shaft 34 is selected so that it is difficult to back drive the gearbox 33. Hence, the weight of the cover member or shield 28, or even additional weight applied, for example, by a person leaning on the cover member 28, will not be able to force the cover member 28 to retract toward a stored position or to extend toward a deployed position.

When the shield 28 is in the deployed or cover position, two lifting lug inserts 39, 40 can be removably attached to the shield 28 by means, such as a friction coupling, so that as the shield 28 pivots upwardly toward the stored position, the lifting lugs 39, 40 come into contact with and interface with the corresponding lower edges 41, 42 of the pivoting extension member 30 to lift and pivot said extension member 30 upwardly toward an extended position. When the pivoting shield 28 pivots downwardly and moves from the stored position toward the deployed position, the extension member 30 lowers toward the retracted position. Once the shield 28 is in the deployed or cover position, the two lifting lug inserts 39, 40 can be removed from the cover member or shield 28.

DETAILED DESCRIPTION OF THE DRAWINGS

FIG. 1 shows an isometric view of a vehicle passenger cabin, generally designated 1, having an actuation means, generally designated 2, (shown in hidden detail dotted lines) and a pivoting extension member 3 in the retracted position for on-road driving, and a pivoting hinge means 4.

Figure 2:
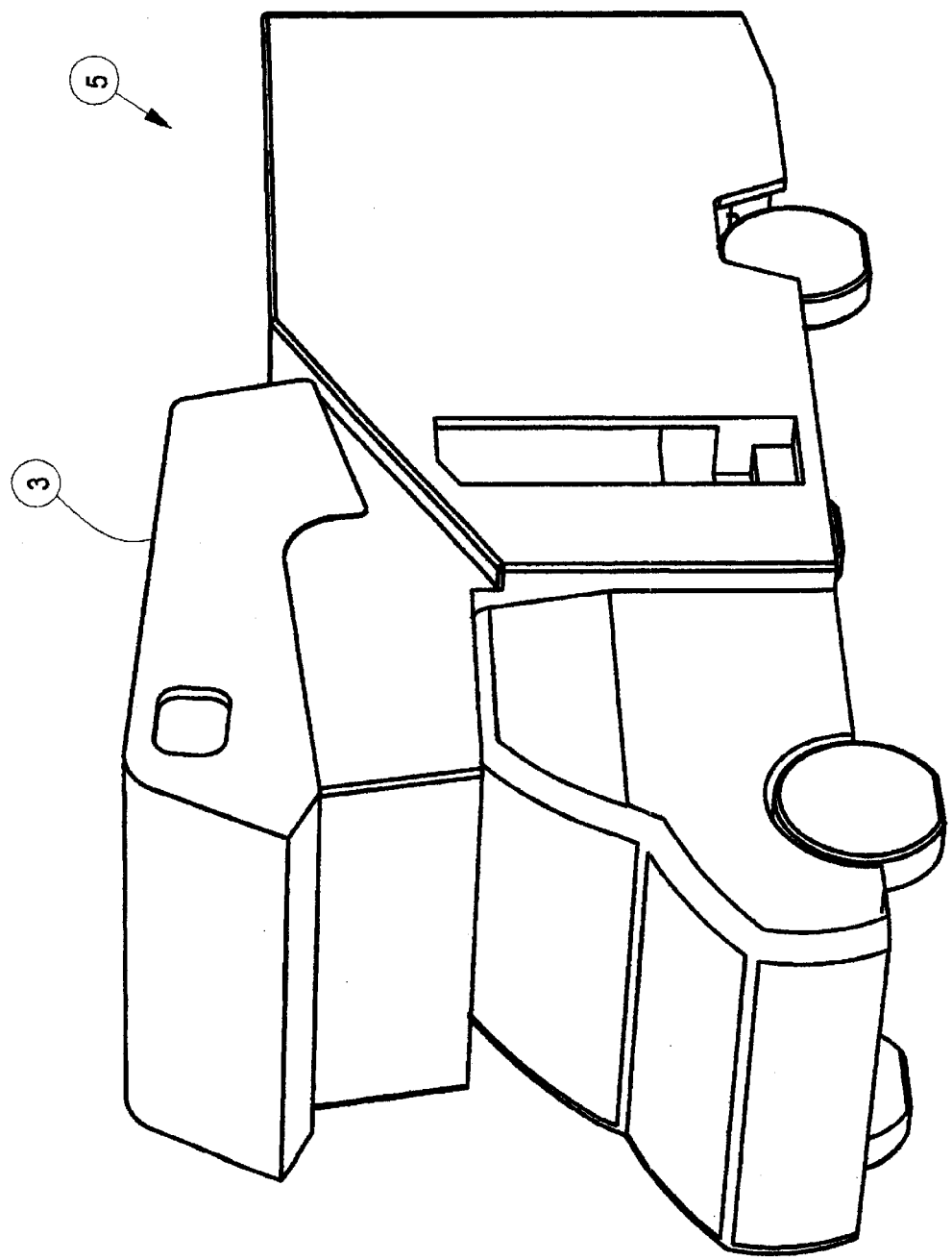
FIG. 2 shows a perspective view of the vehicle passenger cabin with the extension member in the extended position.

FIG. 2 shows an isometric view of a vehicle passenger cabin, generally designated 5, having a pivoting extension member 3 in the extended position for the purpose of increasing the internal volume of said passenger cabin.

Figure 3A:
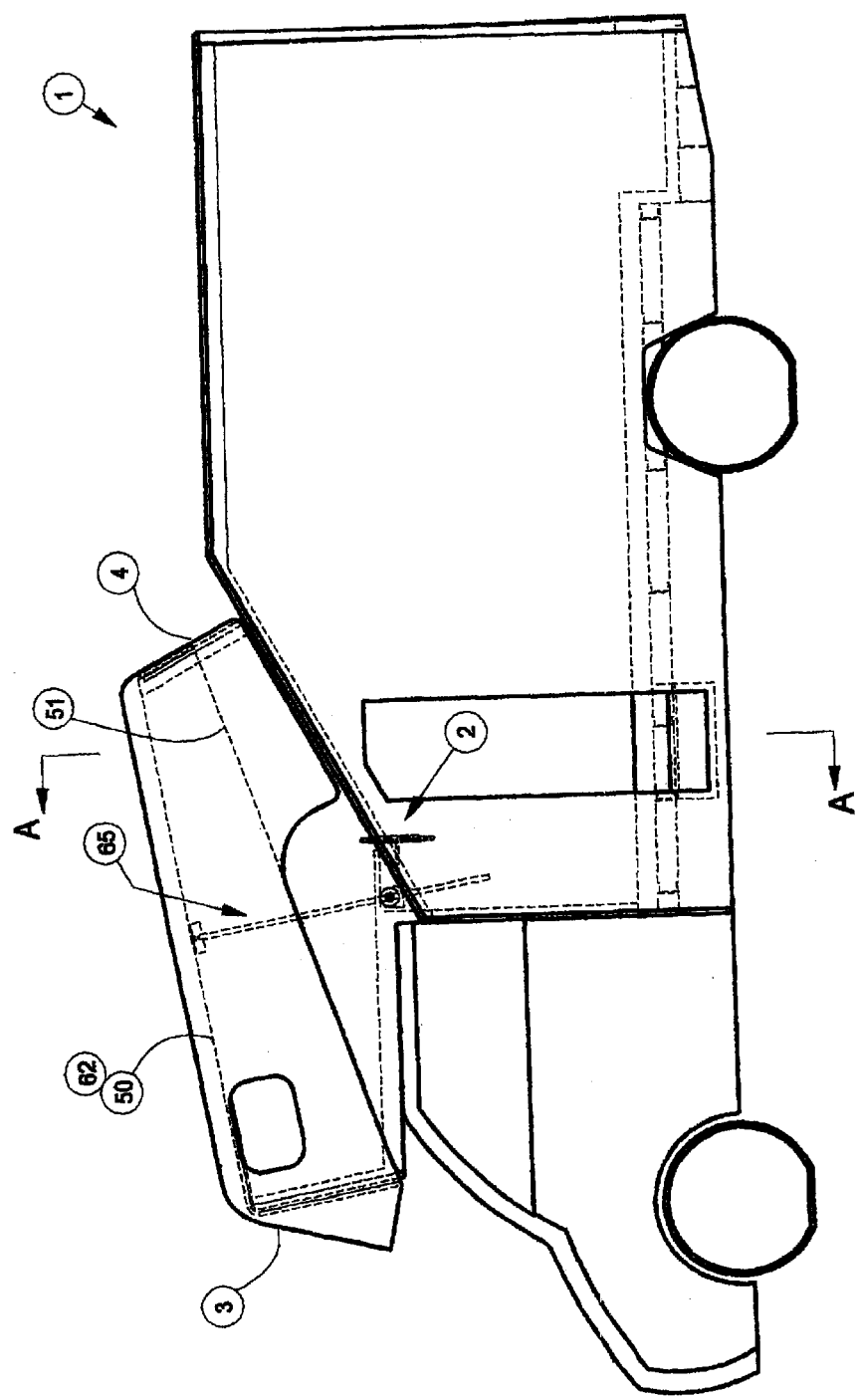
FIGS. 3a and 3b show side elevation views of the vehicle passenger cabin, FIG. 3a, with the extension member in the retracted position and FIG. 3b, with the extension member in the extended position.
Figure 3B:
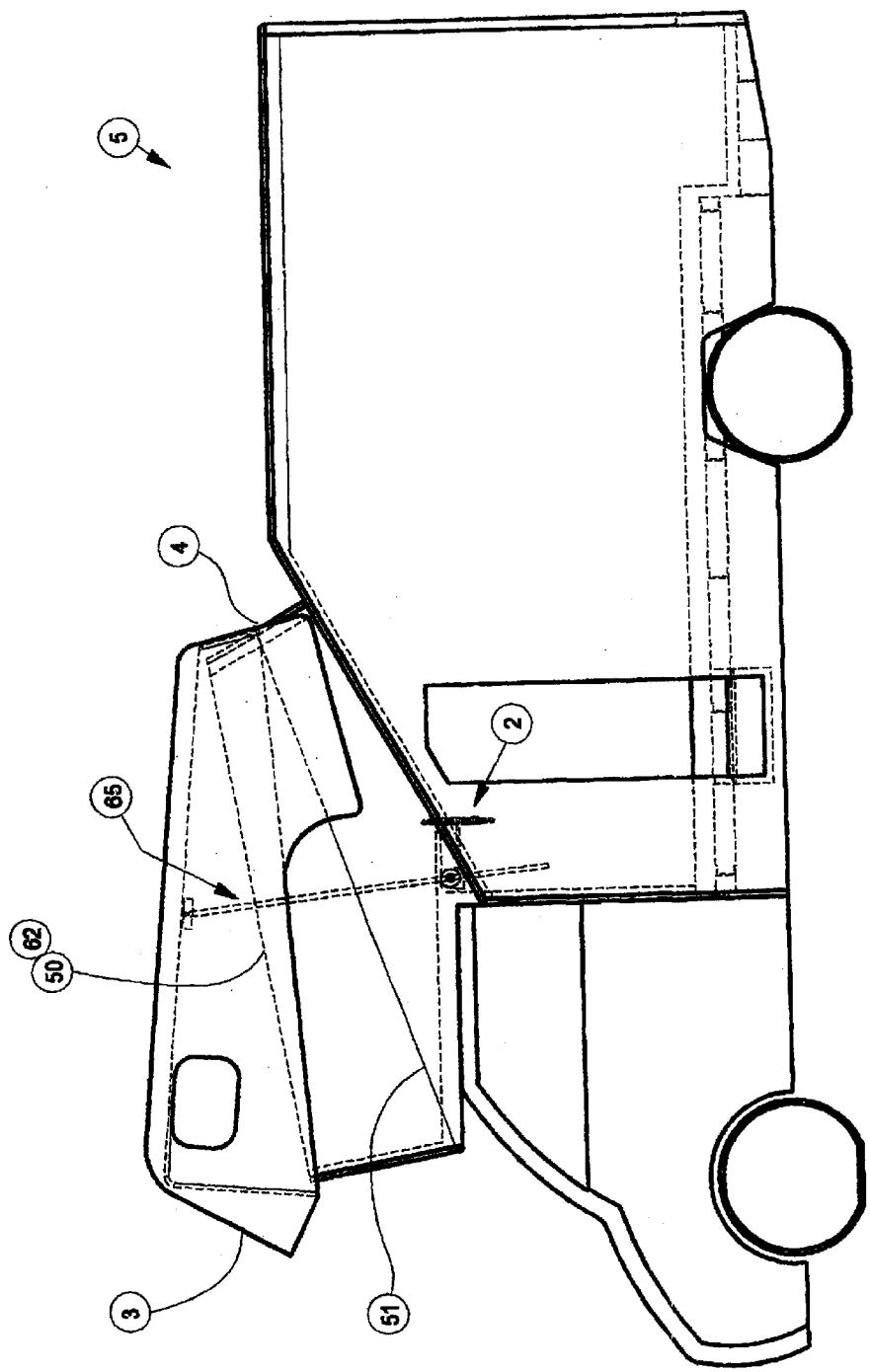

FIGS. 3a and 3b show two side elevation views of a vehicle passenger cabin with observable detail shown as continuous lines and hidden detail shown as dotted lines and wherein are featured actuation means, generally designated 2, counterbalancing means, generally designated 65, pivoting hinge means 4, inner weather seal 50, outer weather seal 51 and draught proof brush seal 62. In one view, generally designated 3a, a pivoting extension member 3 is shown in the retracted position for on-road driving. In another view, generally designated 3b, a pivoting extension member 3 is shown in the extended position for passenger access and use.

Figure 4:
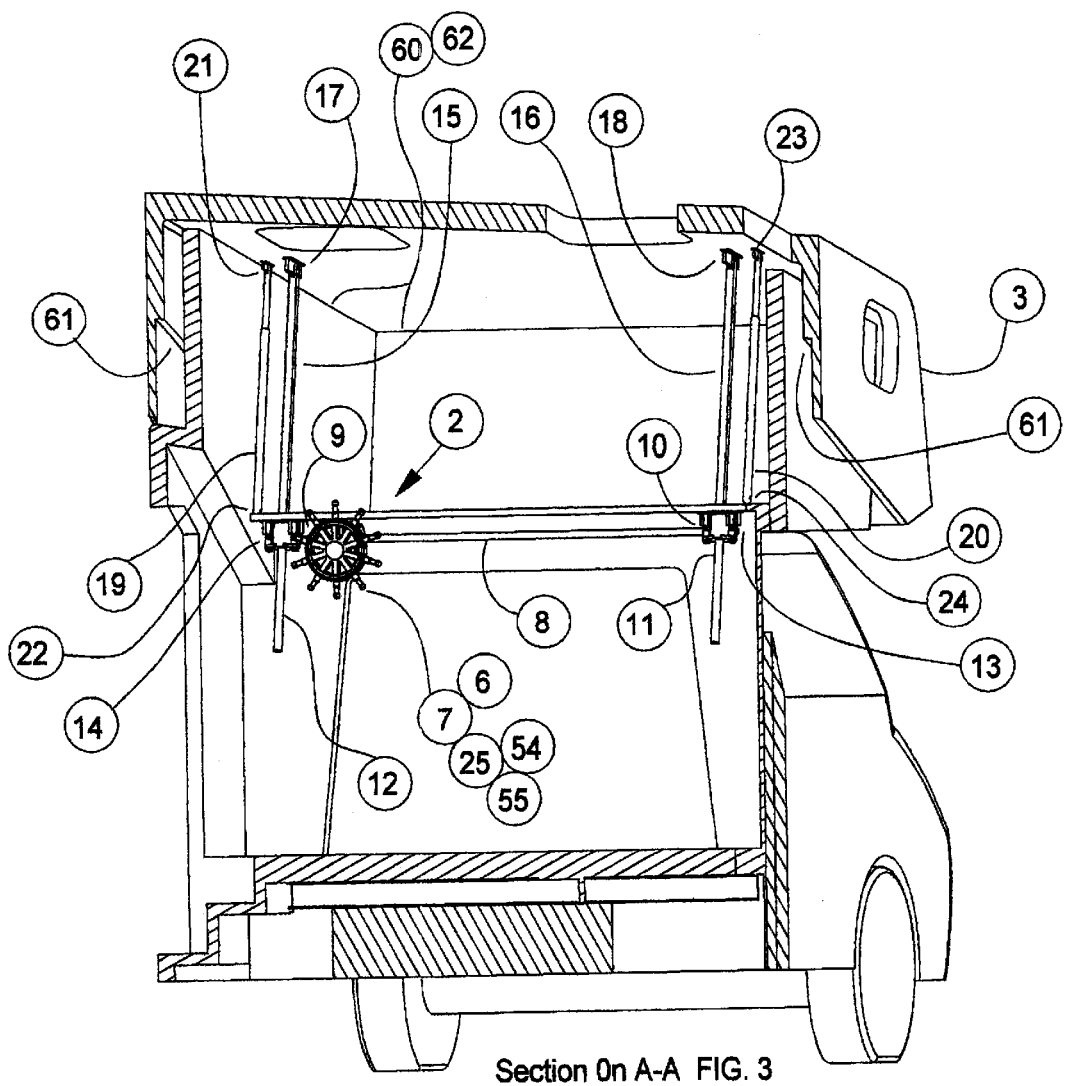
FIG. 4 shows a cross sectional view of the vehicle passenger cabin indicated by arrows A—A on FIG. 3.

FIG. 4 is an isometric section view A—A on FIG. 3a of the vehicle passenger cabin and shows pivoting extension member 3, actuation means, generally designated 2, comprising hand wheel 6 mounted on the input shaft 25 of a standard bevel, right angle gear box 7. The hand wheel 6 end of input shaft 25 is supported by a vehicle bodywork panel 55 onto which is mounted the flange bearing 54, in which input shaft 25 can rotate and through which input shaft 25 can slide in use. The output shaft 8 of the standard bevel, right angle gearbox 7 connects the two input shafts 9 and 10 of the standard screw jacks 11 and 12, both of which pivot on trunnion mountings 13 and 14, respectively. The advantage of using standard screw-jacks is that they are safe in operation. The high gear ratio between the input and the output of standard screw jacks 11 and 12 prevents them from being back-driven. That is, the weight of the pivoting extension member 30, or indeed additional forces such as those applied to the screw jacks 11 and 12 by, for example, someone sitting on the roof of the pivoting extension member 30, will not cause the pivoting extension member 30 to retract. Thus, anyone sitting beneath the extension member 30 will do so in maximum safety. Also, the fitted screw jacks 11, 12 can have a safe working capacity which is ten times greater than the load applied by the extension member 30, even without a fitted counterbalancing means 65, thereby further increasing an already substantial margin of safety. If a counterbalancing means 65 is fitted also, then the margin of safety is many times greater than that applied to automobile tailgates, which are in common use every day, and accepted as safe and adequate for this purpose. The upper end of screw jack lifting screws 15 and 16 are each joined to the pivoting extension member 30, via the pivot joints 17 and 18. As standard screw jacks 11 and 12 pivot in use during the lifting and lowering of the extension member 30, the distance between bevel, right angle gearbox 7 output shaft 8 and vehicle bodywork panel 55 will change. Hence, the input shaft 25 must be allowed to slide through, as well rotate, in flange bearing 54. Counterbalancing means 19 and 20 can comprise a compression spring means or a gas spring means or similar energy storing devices, and each have top pivot joints 21 and 22 connected to the extension member 30, and bottom pivot joints 23 and 24 connected to the vehicle passenger cabin, generally designated 1. As hand wheel 6 (or an electric motor or other actuation means) is turned, the standard bevel, right angle gearbox 7 transmits driving force from the input shaft 25 to the output shaft 8, which is generally perpendicular to it. The output shaft 8 transmits driving force to the two input shafts 9 and 10 of the standard screw jacks 11 and 12. The gearing ratio of both the standard bevel, right angle gearbox 7 and the standard screw jacks 11 and 12 will determine the relationship between the number of hand wheel turns and the rate at which the extension member 3 will lift. Clearly, the weight of the extension member 3, the effort required to turn hand wheel 6, and the force applied by the counterbalancing means 19 and 20 will all have to be considered when selecting the most suitable gear ratios for safe and speedy operation.

The perimeter, internal seal 60 and the perimeter, external seal 61 provide a leak proof seal between the pivoting extension member 30 and the vehicle passenger cabin bodywork to prevent the ingress of hostile weather elements such as rain, wind and dust. The perimeter brush seal 62 provides a wind and draught proof seal between the pivoting extension member 30 and the vehicle passenger cabin bodywork, when the extension member 30 is in either the retracted or extended positions or in any location between the extended and retracted positions.

Figure 5:
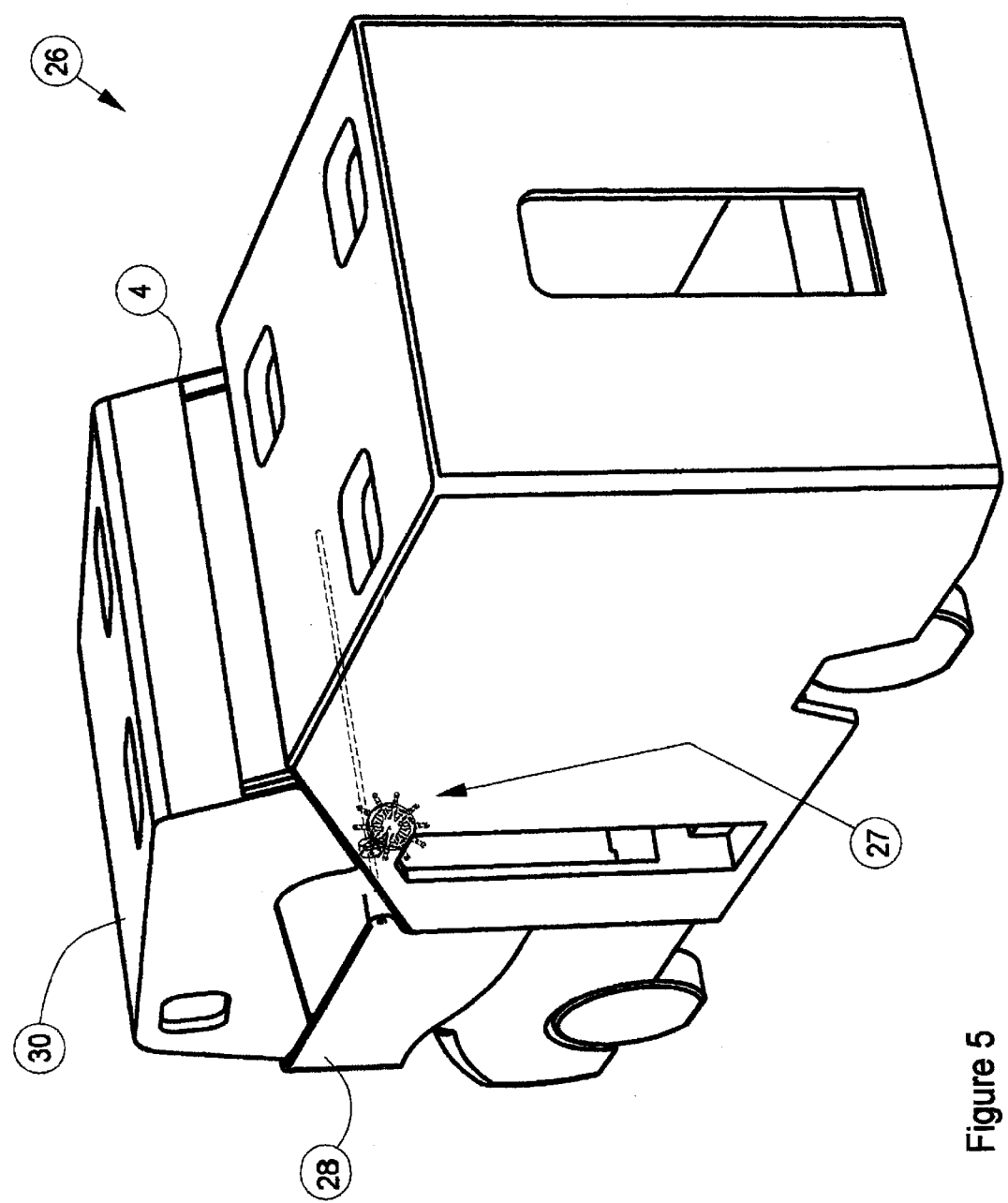
FIG. 5 shows a perspective view of the vehicle passenger cabin with the actuation means drawn as hidden detail dotted lines. The extension member is shown in the retracted position, and the cover member or shield is shown in the deployed position.

FIG. 5 shows an isometric view of a vehicle passenger cabin, generally designated 26, having an actuation means, generally designated 27, (shown as hidden detail dotted lines) and a pivoting extension member 30 in the retracted position, with a pivoting hinge means 4 and a pivoting cover member or shield 28 in the deployed position.

Figure 6:
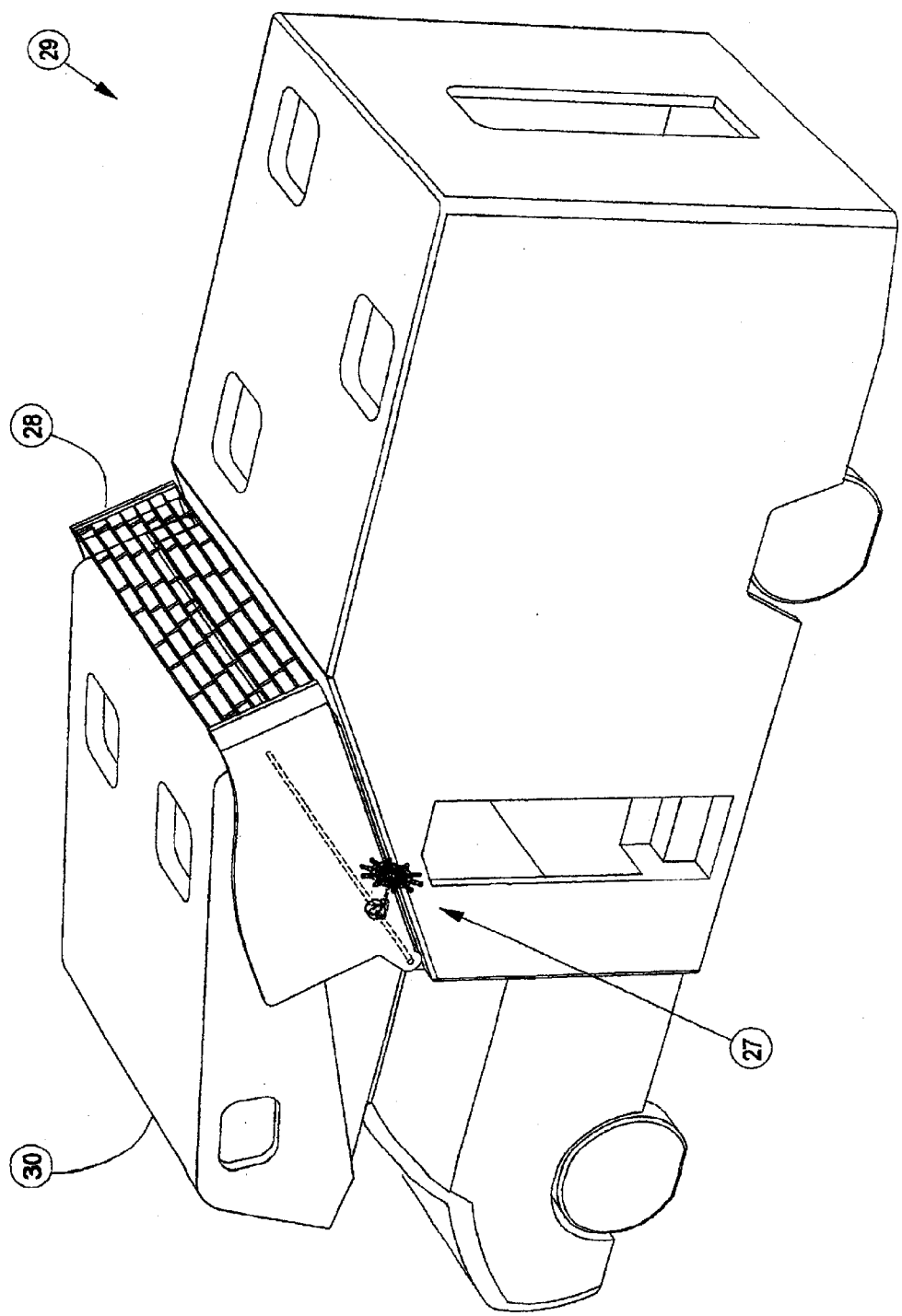
FIG. 6 shows a perspective view of the vehicle passenger cabin with the actuation means drawn as hidden detail dotted lines. The extension member is shown in the retracted position, and the cover member or shield is shown in the stored position.

FIG. 6 shows an isometric view of a vehicle passenger cabin, generally designated 29, having an actuation means, generally designated 27, (shown as hidden detail dotted lines), with a pivoting extension member 30 in the retracted position and a pivoting cover member or shield 28 in the retracted position.

Figure 7:
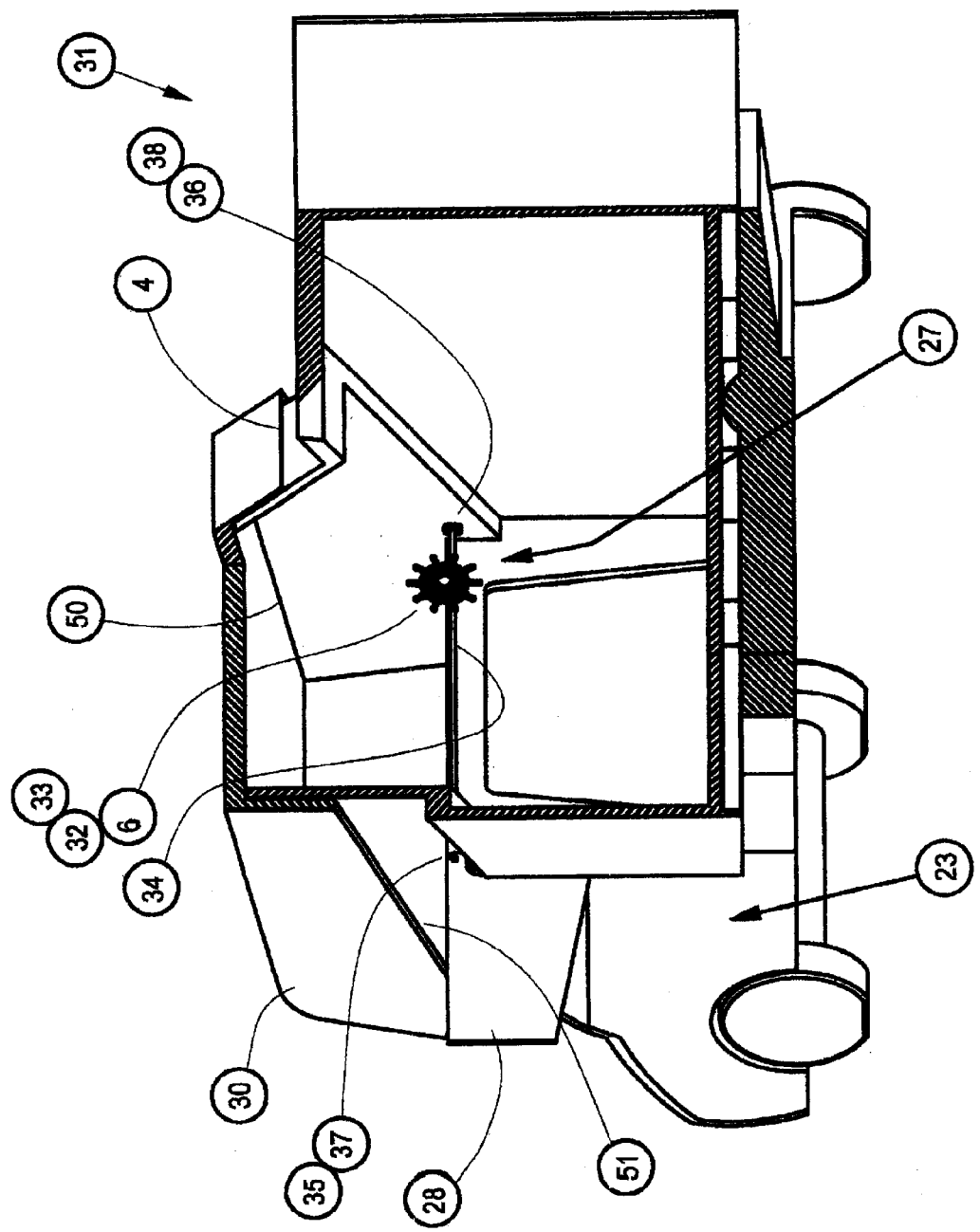
FIG. 7 shows a perspective view of the vehicle passenger cabin with part of two walls and part of the roof and floor removed to reveal the actuation means, with the extension member in the retracted position and the cover member or shield in the deployed position.

FIG. 7 shows a part sectional and a part isometric view of a vehicle passenger cabin, generally designated 31, having an actuation means, generally designated 27, comprising a hand wheel 6 mounted onto the input shaft 32 of a wall mounted worm gearbox 33. The gear ratio between the input drive shaft 32 and the output drive shaft 34 of worm gearbox 33 is sufficiently great to resist back driving. This is to be preferred for reasons of safety. The worm gearbox 33 output drive shaft 34 extends to either side to attach to the cover member or shield 28 (shown in the deployed position) by means of friction couplings 35 and 36, and the drive shaft 34 is supported in wall mounted flange bearings 37 and 38. A pivoting hinge means 4 is shown, and the extension member 30 is shown in the retracted position, with the cover member or shield 28 shown in the deployed position. An inner seal 50 and an outer seal 51 prevent the ingress of wind, rain and dust.

Figure 8:
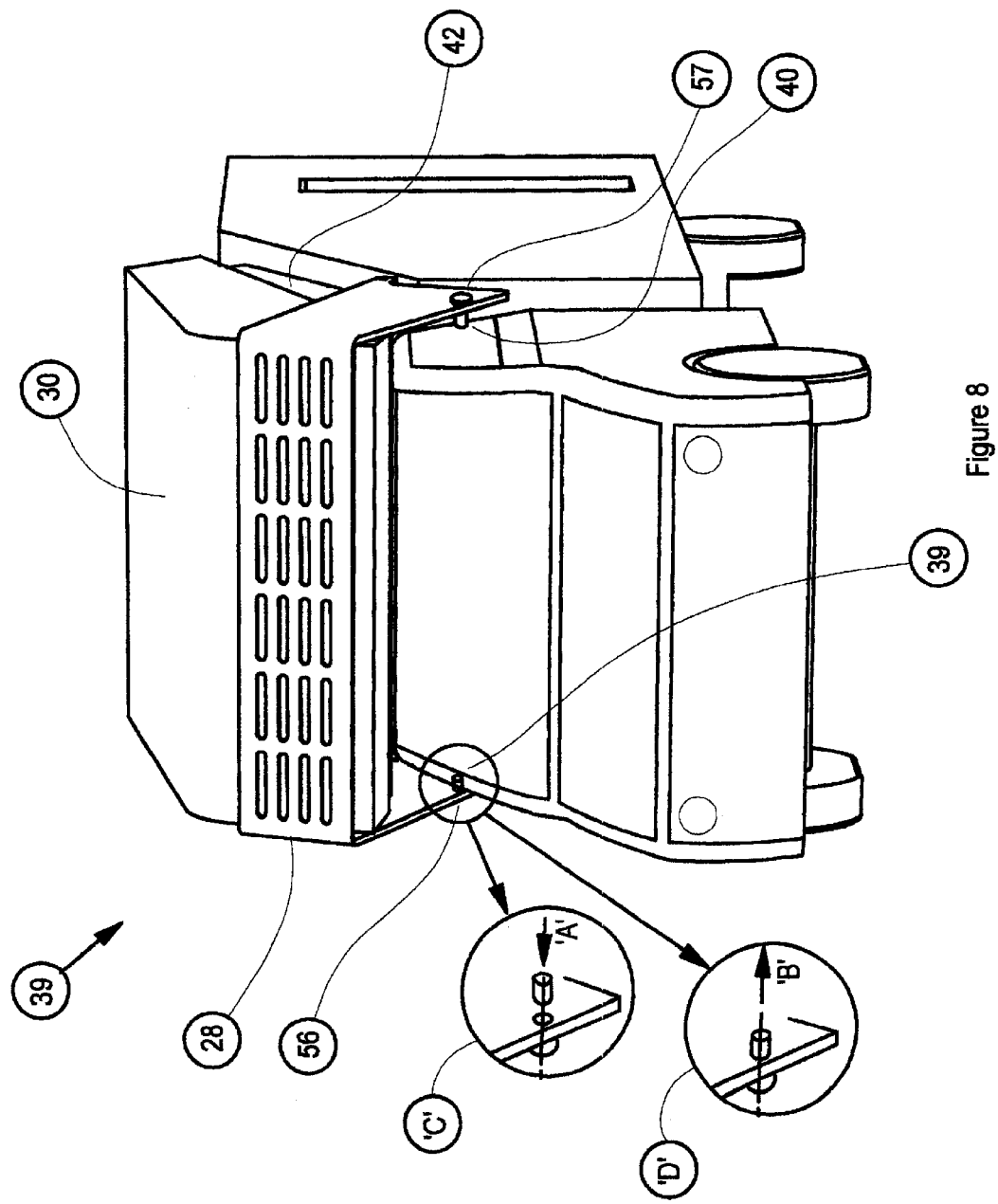
FIG. 8 shows a perspective view of the vehicle passenger cabin with the extension member in the retracted position and the cover member or shield in the part deployed position.

FIG. 8 shows an isometric view with two detail views, 'C' and 'D', of a vehicle passenger cabin, generally designated 39, having the pivoting extension member 30 shown in the retracted mode. The lifting lugs 39 and 40 are also shown. Arrow 'A' shows the direction that the lifting lug 39 is inserted into the receiving aperture 56 in the cover member or shield 28. Arrow 'B' shows the direction that the lifting lug 39 is extracted from the receiving aperture 56 in the cover member or shield 28. There is a similar receiving aperture 57 for the lifting lug 40 on the opposite side of the cover member or shield 28. A catch or shoot bolt or a friction coupling can be added to reversibly retain the lifting lugs 39 and 40 in their respective receiving apertures 56 and 57.

When the cover member or shield 28 is moved upwardly toward the stored position by an actuation means 27 (not shown), the lifting lugs 39 and 40 interface with the lower edges 41 (not shown) and 42 of the pivoting extension member 30 to move it upwardly toward the extended position. In reverse, moving the cover member or shield 28 in the opposite direction toward the deployed position results in lowering the extension member 30 toward the retracted position. Thus, by inserting the lifting lugs 39 and 40 into their receiving apertures 56 and 57, and by deploying and retracting the cover member or shield 28, it is possible to extend and retract the extension member 30. When the lifting lugs 39 and 40 are removed from their respective receiving apertures 56 and 57, deploying and storing the cover member or shield 28 only covers and uncover the cab window area.

Figure 9:
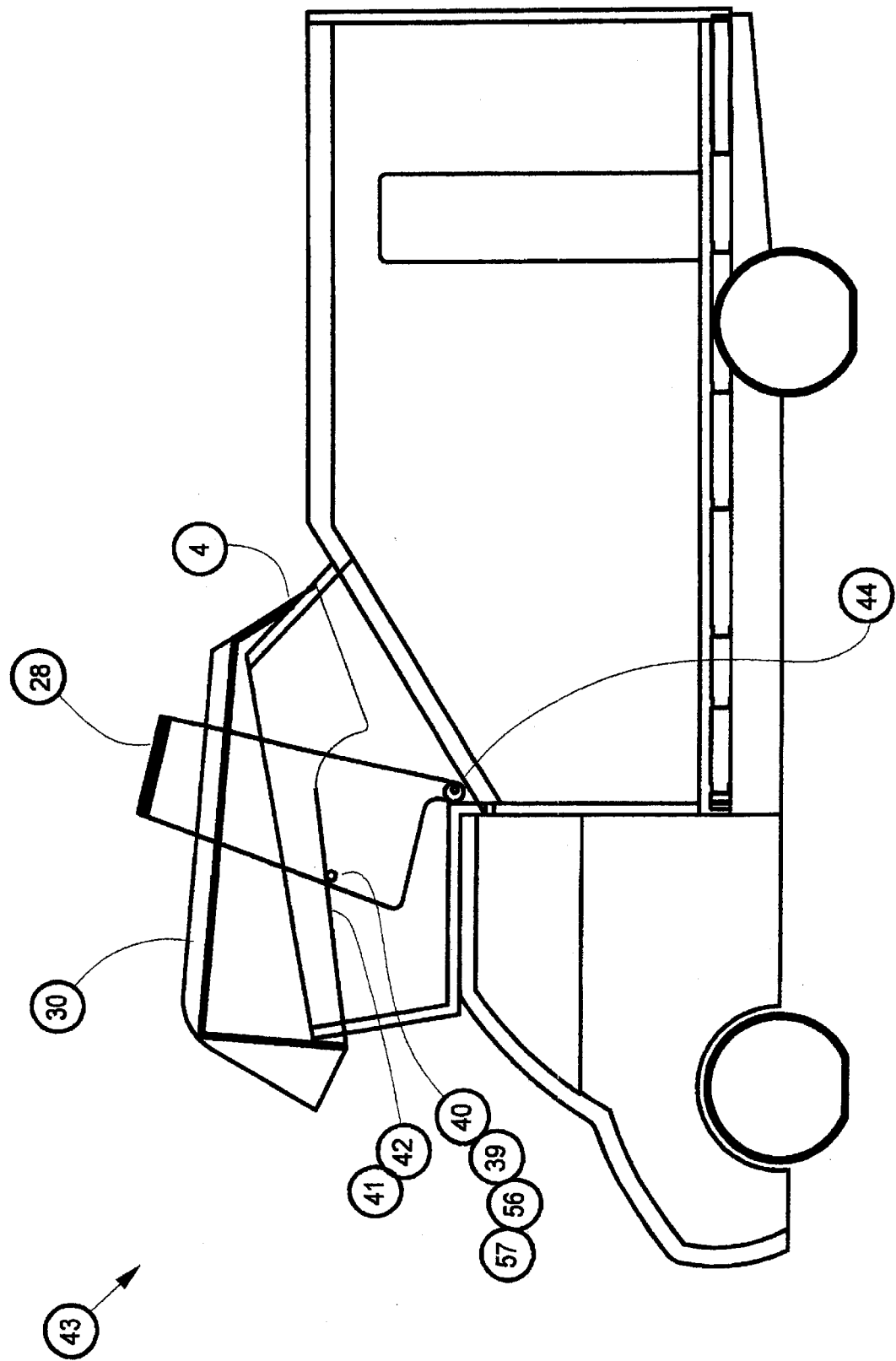
FIG. 9 shows a side elevation view of the vehicle passenger cabin with both the extension member partly extended and the cover member or shield partly deployed.

FIG. 9 shows a side elevation view of a vehicle passenger cabin, generally designated 43, having the pivoting extension member 30 with a pivoting hinge means 4, the lifting lugs 39 (not shown) and 40 in there respective receiving apertures 56 and 57, the pivoting cover member or shield 28 with a pivoting actuation means 44. The figure shows the pivoting cover member or shield 28 partly deployed with the lifting lugs 39 (not shown) and 40 interfacing or engaged with the lower edges 41 (not shown) and 42 of the pivoting extension member 30, thereby lifting and pivoting the extension member 30 toward an extended position.

Figure 10:
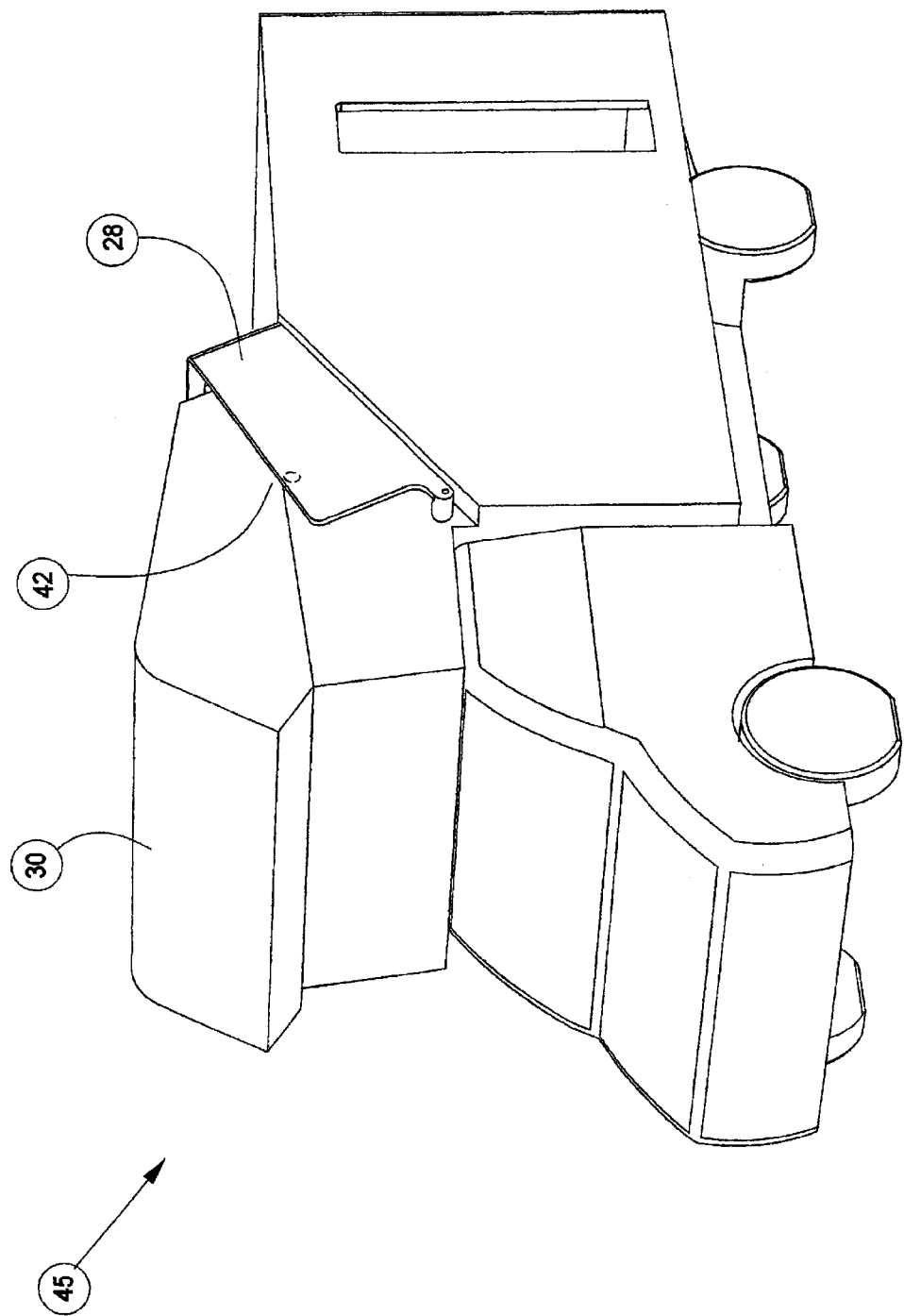
FIG. 10 shows a perspective view of the vehicle passenger cabin with the extension member in the extended position and the cover member or shield in the stored position.

FIG. 10 shows an isometric view of a vehicle passenger cabin, generally designated 45, having the pivoting extension member 30 in the fully extended position, held in position by the lifting lugs 41 (not shown) and 42 attached for lifting the pivoting cover member or shield 28, which is shown in the fully stored position.

Figure 11:
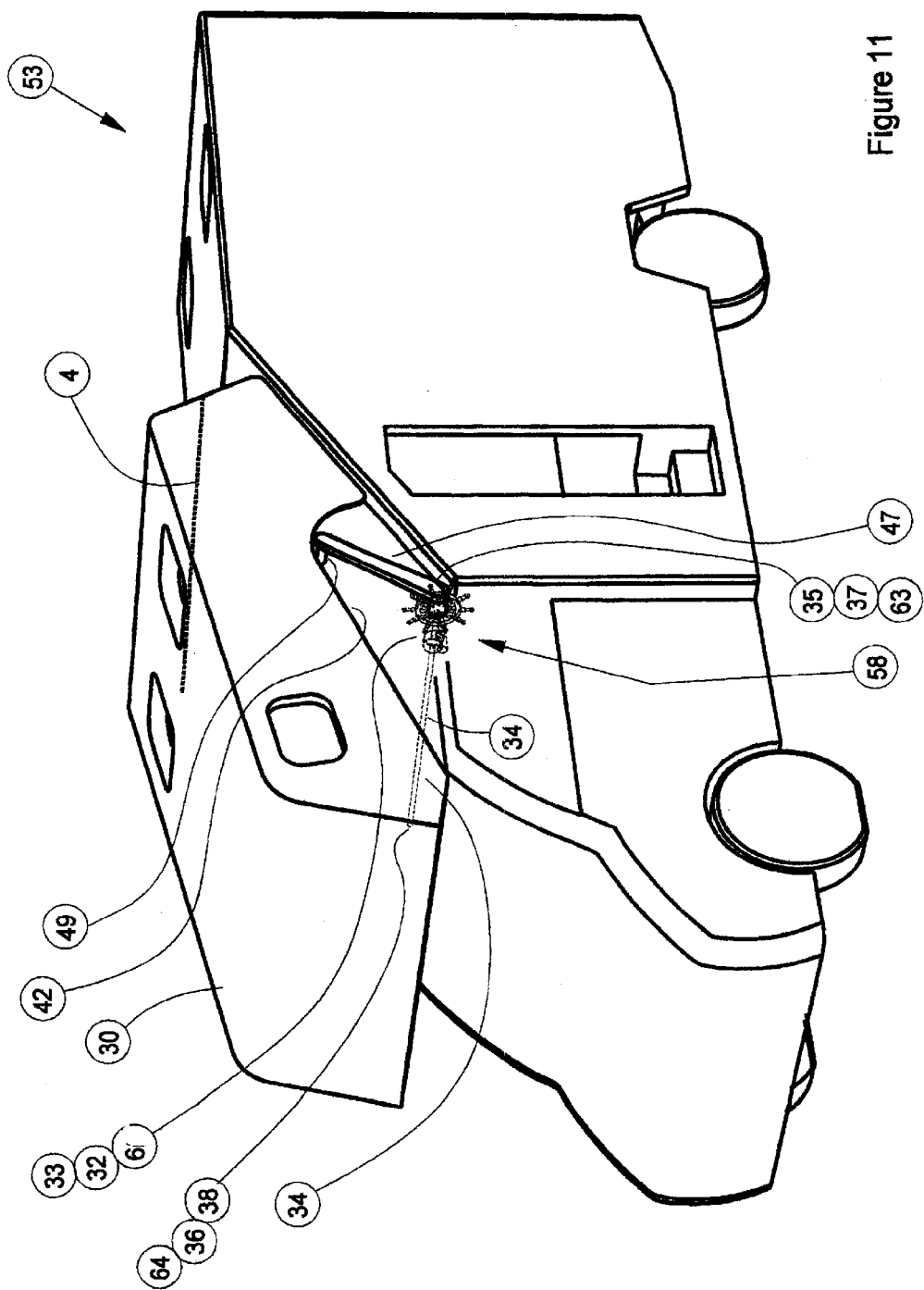
FIG. 11 shows a perspective view of the vehicle passenger cabin with the extension member in the retracted position and the actuation means shown as hidden detail dotted lines.

FIG. 11 shows an isometric view of a vehicle passenger cabin, generally designated 53, wherein the actuation means, generally designated 58, (shown as hidden detail dotted lines) comprises a hand wheel 6 with a key and keyway mounted onto the input shaft 32 of a wall mounted worm gearbox 33. The gearbox output shaft 34, which extends toward either side to attach to a first portion 63 and 64 of the lifting arms 46 (not shown) and 47, by means of friction couplings 35 and 36, is supported in wall mounted flange bearings 37 and 38. The lifting lugs 48 (not shown) and 49 are fixedly attached to a second portion of the lifting arms 46 (not shown) and 47. In use, the lifting lugs 48 (not shown) and 49 interface with the lower edges 41 (not shown) and 42 of the extension member 30 to move it between extended and retracted positions, with the extension member 30 pivoting about the hinge member 4 (shown in hidden detail dotted lines). There is no cover member or shield in this embodiment.

Figure 12:
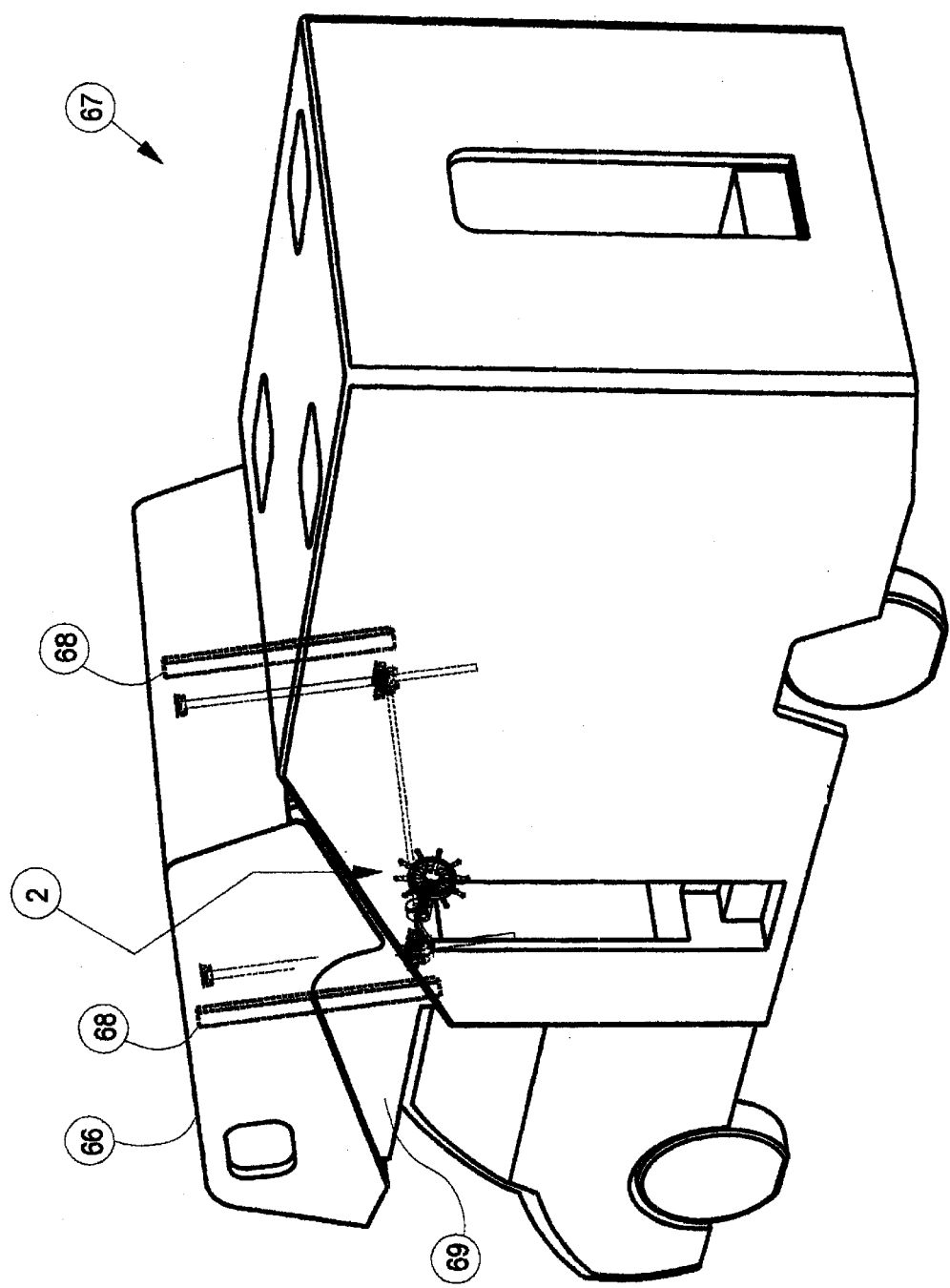
FIG. 12 shows a perspective view of the vehicle passenger cabin with the actuation means drawn in as hidden detail dotted lines. The sliding extension member is shown in the retracted position.

FIG. 12 shows an isometric view of a vehicle passenger cabin, generally designated 67, having an actuation means, generally designated 2, (shown in hidden detail dotted lines). There is also shown an upstanding wall 69, around which and over which is positioned a sliding extension member 66, shown in the retracted position for on-road driving. Included are two standard linear bearing sliding means 68 (shown in hidden detail dotted lines), which, in part, are fixed by fastening means to the passenger cabin extension portion upstanding wall 69, and in part are fixed by a fastening means to the extension member 66.

Figure 13:
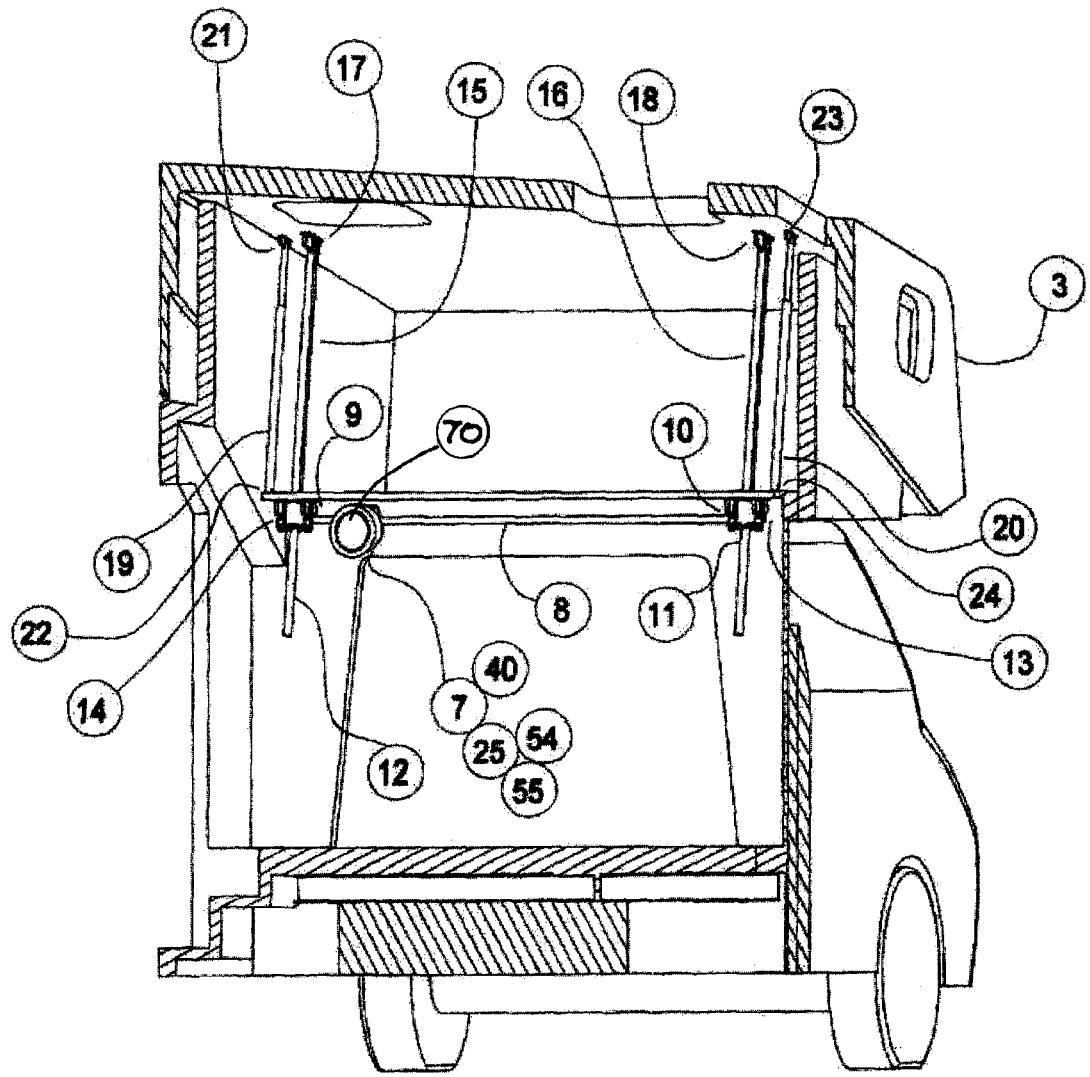

FIG. 13 is an isomeric section view A—A on FIG. 3a of the vehicle passenger cabin and shows the actuation means comprising an electric motor 70 mounted on the input shaft 25 of a standard bevel, right angle gear box 7.

While the present invention has been described with reference to several particular example embodiments, those skilled in the art will recognize that many changes may be made thereto without departing from the spirit and scope of the present invention, which is set forth in the following claims.

What is claimed is:

1. A vehicle passenger cabin defining a passenger space, said passenger cabin including an extension member movable between an extended position that is elevated relative to said cabin, and a retracted position that is retracted relative to said cabin, said extension member in the extended position increasing the volume of said passenger space, wherein said extension member comprises a rigid body in continuous moveable contact with the passenger cabin in both the extended and retracted positions.

2. A cabin as claimed in claim 1 wherein said extension member is insulated.

3. A cabin as claimed in claim 1 wherein said extension member is pivotable about at least one pivot axis between said extended and retracted positions.

4. A cabin as claimed in claim 1 wherein said extension member is slidable between said extended and retracted positions.

5. A cabin as claimed in claim 1 wherein said cabin includes an extension portion defined by an upstanding wall, said extension member positioned over and around said upstanding wall.

6. A cabin as claimed in claim 1 further including sealing means disposed between said passenger cabin and said extension member.

7. A cabin as claimed in claim 6 wherein said sealing means is disposed between the extension member and an upstanding wall of said passenger cabin.

8. A cabin as claimed in claim 1 further including actuation means operable to move said extension member between said extended and retracted positions.

9. A cabin as claimed in claim 8 wherein said actuation means comprise one or more gas springs secured between the cabin and the extension member.

10. A cabin as claimed in claim 8 wherein said actuation means includes motive means fixed relative to said cabin and force transmission means movable relative to said cabin.

11. A cabin as claimed in claim 10 wherein said motive means are electrically operable.

12. A cabin as claimed in claim 10 wherein said motive means are manually operable.

13. A cabin as claimed in claim 10 wherein said motive means comprise a hand wheel and said force transmission means comprise at least one jacking elements.

14. A cabin as claimed in claim 1 further including counterbalance means to counterbalance said extension member in an extended condition.

15. A cabin as claimed in claim 14 wherein said counterbalance means comprises at least one gas spring secured between the cabin and the extension member.

16. A cabin as claimed in claim 1 further including a shield pivotable between a stored position and a deployed position, said shield in said deployed position overlying at least one window aperture of said cabin.

17. A vehicle passenger cabin defining a passenger space, said passenger cabin including an extension member movable between an extended position that is elevated relative to said cabin, and a retracted position that is retracted relative to said cabin, said extension member in the extended position increasing the volume of said passenger space, wherein said extension member comprises a rigid body in continuous moveable contact with the passenger cabin in both the extended and retracted positions; and an actuation means operable to move said rigid extension member between said extended and retracted positions, said actuation means including motive means fixed relative to said cabin and force transmission means movable relative to said cabin.

18. A vehicle passenger cabin defining a passenger space, said passenger cabin including an extension member movable between an extended position that is elevated relative to said cabin, and a retracted position that is retracted relative to said cabin, said extension member in the extended position increasing the volume of said passenger space, wherein said extension member comprises a rigid body in continuous moveable contact with the passenger cabin in both the extended and retracted positions;

an actuation means operable to move said rigid extension member between said extended and retracted positions, said actuation means including motive means fixed relative to said cabin and force transmission means movable relative to said cabin; and a counterbalance means for counterbalancing said extension member in the extended position.

* * * * *